(12) United States Patent
Seok et al.

(10) Patent No.: US 9,860,713 B2
(45) Date of Patent: Jan. 2, 2018

(54) METHOD OF DISCOVERING AND INFORMING OF SERVICE IN WIRELESS LAN SYSTEM AND APPARATUS FOR SUPPORTING SAME

(71) Applicant: LG ELECTRONICS INC., Seoul (KR)

(72) Inventors: Yong Ho Seok, Anyang-si (KR); Ji Hyun Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 14/355,178

(22) PCT Filed: Nov. 19, 2012

(86) PCT No.: PCT/KR2012/009803
§ 371 (c)(1),
(2) Date: Apr. 29, 2014

(87) PCT Pub. No.: WO2013/073925
PCT Pub. Date: May 23, 2013

(65) Prior Publication Data
US 2015/0003327 A1    Jan. 1, 2015

Related U.S. Application Data

(60) Provisional application No. 61/561,264, filed on Nov. 18, 2011, provisional application No. 61/561,940, filed on Nov. 21, 2011.

(51) Int. Cl.
*H04W 4/06* (2009.01)
*H04W 68/00* (2009.01)
(Continued)

(52) U.S. Cl.
CPC ............ *H04W 4/06* (2013.01); *H04W 68/00* (2013.01); *H04W 74/002* (2013.01);
(Continued)

(58) Field of Classification Search
CPC ..... H04W 4/06; H04W 68/00; H04W 74/002; H04W 74/04; H04W 75/08; H04W 84/12
See application file for complete search history.

(56) References Cited

U.S. PATENT DOCUMENTS 5,365,516 A * 11/1994 Jandrell ................ G01S 5/0009
340/991
2003/0157949 A1* 8/2003 Sarkkinen ............. H04L 12/189
455/503

(Continued)

FOREIGN PATENT DOCUMENTS

| KR | 1020080083088 A | 9/2008 |
|---|---|---|
| KR | 101002894 B1 | 12/2010 |
| KR | 1020110097564 A | 8/2011 |

*Primary Examiner* — Walter Divito
(74) *Attorney, Agent, or Firm* — Lee Hong Degerman Kang Waimey

(57) ABSTRACT

The present invention relates to a method of informing of a service that is performed by a first station (STA) in a wireless LAN system. The method includes receiving a second service informing frame from a second STA, wherein the second service informing frame includes second service information that is the information on a service served by the second STA; and transmitting a first service informing frame. The first service informing frame includes first service information that is the information on a service served by the first STA, and the second service information.

6 Claims, 14 Drawing Sheets

(51) Int. Cl.
*H04W 74/04* (2009.01)
*H04W 74/00* (2009.01)
*H04W 74/08* (2009.01)
*H04W 84/12* (2009.01)

(52) U.S. Cl.
CPC ............ *H04W 74/04* (2013.01); *H04W 74/08* (2013.01); *H04W 84/12* (2013.01)

(56) References Cited

U.S. PATENT DOCUMENTS

| | | | |
|---|---|---|---|
| 2008/0219192 A1* | 9/2008 | Sim | H04W 76/002 370/310 |
| 2010/0248635 A1 | 9/2010 | Zhang et al. | |
| 2012/0166671 A1* | 6/2012 | Qi | H04L 45/64 709/236 |
| 2013/0070605 A1* | 3/2013 | Ghosh | H04W 72/082 370/241 |

* cited by examiner

METHOD OF DISCOVERING AND INFORMING OF SERVICE IN WIRELESS LAN SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2012/009803, filed on Nov. 19, 2012, which claims the benefit of U.S. Provisional Application Ser. Nos. 61/561,264, filed on Nov. 18, 2011 and 61/ 561,940, filed on Nov. 21, 2011, the contents of which are all hereby incorporated by reference herein in their entirety.

BACKGROUND OF THE INVENTION

Field of the Invention

The present invention relates to wireless communication, and more particularly, to a method of discovering and announcing a service supported in a wireless local area network (WLAN) system, and an apparatus supporting the method.

Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The institute of electrical and electronics engineers (IEEE) 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate.

In an infrastructure WLAN system environment managed by an access point (AP), a station (STA) may receive from the AP a service desired to be received by a user. The STA may query whether the AP is capable of providing a specific service to receive the service, and may determine whether the service can be provided by receiving a response from the AP. Accordingly, the STA can receive the specific service from the AP.

The STA may also receive a service from another STA which coexists in the WLAN system. This may more frequently occur in a WLAN system in which the STA is increased in number and thus many STAs coexist. For this, the STA may query to another STA whether a service can be performed, and may determine whether the service can be provided by receiving a response thereof.

A procedure for service discovery may be performed mutually exclusively with respect to an operation when a service is provided in practice. For example, radio signal transmission/reception for the service discovery also occupies a channel, and accordingly, channel occupation may be excluded for data transmission/reception when the service is provided in practice. This may result in a decrease in efficiency of a WLAN service.

In addition, the STA consumes power due to the procedure performed for the service discovery. In particular, from a perspective of an STA which operates on a battery basis, an operation performed for the service discovery or an operation performed always in an awake state as a response regarding whether a service can be provided may be a cause of unnecessary great power consumption.

Accordingly, there is a need for a service discovery method capable of solving an unnecessary power consumption problem and a problem related to a deterioration in WLAN service efficiency and capable of providing a service in a more effective manner.

SUMMARY OF THE INVENTION

The present invention provides a method of discovering a service in a wireless local area network (WLAN) system, and an apparatus supporting the method.

In an aspect, a service announcement method performed by a first station (STA) in a wireless local area network (LAN) system is provided. The method includes receiving a second service announcement frame from a second STA, wherein the second service announcement frame includes second service information which is information on a service provided by the second STA, and transmitting a first service announcement frame. The first service announcement frame includes first service information, which is information on a service provided by the first STA, and the second service information.

The first service announcement frame and the second service announcement frame may be transmitted through the same channel.

The first service announcement frame may repetitively be transmitted.

The first service announcement frame may include a first service announcement interval field. The first service announcement interval field may indicate a first service announcement interval which enters an awake state so that the first STA repetitively transmits the first service announcement frame. The method may further include entering the awake state periodically according to the first service announcement interval.

The first service announcement interval may be determined on the basis of the number of STAs related to service information included in the first service announcement frame.

The method may further include entering an awake state, and attempting to acquire a channel access right to transmit the first service announcement frame.

The attempting to acquire the channel access right may be performed on the basis of a PIFS (PCF (Point Coordination Function) Interframe Space).

The method may further include entering an awake state at a time when the second STA enters the awake state of the first STA, and attempting to acquire a channel access right by the second STA to retransmit the second service announcement frame. The attempting to acquire the channel access right by the second STA may be performed on the basis of a DIFS (DCF (Distributed Coordination Function) Interframe Space).

In another aspect, a wireless device operating in a wireless local area network (WLAN) system is provided. The wireless device includes a transceiver for transmitting and receiving a radio signal, and a processor operatively coupled to the transceiver and configured for receiving a second service announcement frame from a station (STA), and transmitting a first service announcement frame. The second service announcement frame includes second service information which is information on a service provided by the STA. The first service announcement frame includes first service information, which is information on a service provided by the first STA, and the second service information.

A service discovery method according to an embodiment of the present invention provides a method for requesting and responding whether to provide a service on the basis of a generic announcement service (GAS) protocol. Before being associated by performing an association/authentication operation with a specific access point (AP), a station (STA) may determine whether the specific AP provides a specific service. By the support of this method, the STA can effectively discover a service desired to be received by the STA itself in a wireless local area network (WLAN) environment managed by the AP similarly to an infrastructure basic service set (BSS).

In a service announcement method according to an embodiment of the present invention, an STA periodically announces information regarding a service provided by the STA itself and information regarding a service provided by a different STA. In addition, the STA may receive a service announcement frame from the different STA to determine whether to update service information, and may update the service information to be announced by the STA itself by using the service announcement frame. If the service information to be announced is updated, the STA may be configured such that it can preferentially access a channel to announce this. Accordingly, information related to a service provided by STAs can also be announced normally through a specific channel to an STA which intends to consume the service. By the support of this method, an STA which is a service consumer in a WLAN environment where a communication system management entity does not exist similarly to an independent BSS (IBSS) can effectively discover whether a desired service is provided in a current WLAN environment.

DESCRIPTION OF EXEMPLARY EMBODIMENTS

Figure 1:
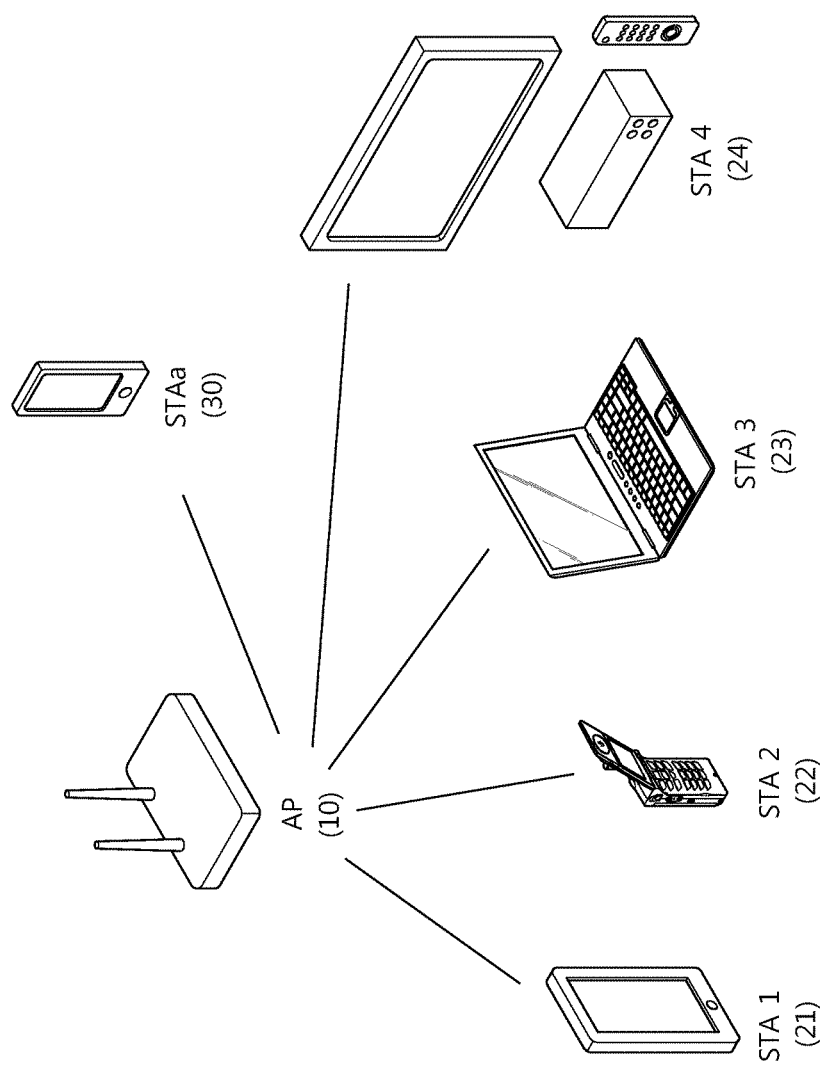
FIG. 1 shows a structure of a typical wireless local area network (WLAN) system according to an embodiment of the present invention.

FIG. 1 shows a structure of a typical wireless local area network (WLAN) system according to an embodiment of the present invention.

Referring to FIG. 1, the WLAN system includes one or more basic service sets (BSSs). The BSS is a set of stations (STAs) which are successfully synchronized to communicate with one another, and is not a concept indicating a specific region.

An infrastructure BSS includes one or more non-access point (AP) STAs (i.e., a non-AP STA1 21, a non-AP STA2 22, a non-AP STA3 23, a non-AP STA4 24, and a non-AP STAa 30), an AP 10 for providing a distribution service, and a distribution system (DS) connecting the plurality of APs. In the infrastructure BSS, the AP manages the non-AP STAs of the BSS.

On the other hand, an independent IBSS (IBSS) is a BSS operating in an ad-hoc mode. Since the IBSS does not include the AP, a centralized management entity for performing a management function in a centralized manner does not exist. That is, the IBSS manages the non-AP STAs in a distributed manner. In the IBSS, all STAs may consist of mobile STAs, and a self-contained network is configured since connection to the DS is not allowed.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller or control STA, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sensing, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AT and/or an STA transmitting a corresponding frame.

Together with a distributed coordination function (DCF), an IEEE 802.11 MAC protocol provides a hybrid coordination function (HCF) based on a point coordination function (PCF) which periodically performs polling so that all receiving APs and/or STAs can receive a data packet according to the DCF and a polling-based synchronous access scheme. The HCF has a contention-based enhanced distributed channel access (EDCA) based on a contention-based channel access scheme for providing a data packet to multiple users and a HCF controller channel access (HCCA) based on a contention free-based channel access scheme using a polling mechanism. The HCF includes a medium access mechanism for improving quality of service (QoS) of the WLAN, and can transmit QoS data in both a contention period (CP) and a contention free period (CFP).

According to a feature of wireless media, a wireless communication system cannot directly know the existence of a network when an STA powers on and starts its operation. Therefore, the STA has to perform a network discovery procedure to access a network regardless of an STA type. Upon discovering the network through the network discovery procedure, the STA selects a network to be registered through a network selection procedure. Thereafter, the STA is registered to the selected network, and performs a data exchange operation performed in a transmitting end/receiving end.

The network discovery procedure in the WLAN system is implemented with a scanning procedure. The scanning procedure is divided into passive scanning and active scanning. The passive scanning is based on a beacon frame which is periodically broadcast by an AP. In general, an AP of WLAN broadcasts a beacon frame in every specific interval (e.g., 100 msec). The beacon frame includes information regarding a BSS managed by itself. The STA passively waits to receive the beacon frame in a specific channel. Upon obtaining information regarding the network through the reception of the beacon frame, the STA ends a scanning procedure in the specific channel. Since the passive scanning is achieved as long as the STA receives the beacon frame without having to transmit an additional frame, there is an advantage in that an overall overhead is small. However, there is also a disadvantage in that a scanning time is increased in proportion to a transmission period.

The active scanning is that the STA actively broadcasts a probe request frame in a specific channel to request network information from all APs which have received the frame. Upon receiving the probe request frame, the AP waits for a random time duration to avoid a frame collision and thereafter transmits to a corresponding STA the probe response frame by including the network information therein. The STA receives the probe response frame and thus acquires the network information, thereby ending the scanning procedure. The active scanning has an advantage in that the scanning can be finished within a relatively quick time. On the other hand, since a frame sequence is required in a request-response process, an overall network overhead is increased.

When the scanning procedure is finished, the STA selects a network according to a specific criterion for the STA itself, and thereafter performs an authentication procedure with respect to the AP. The authentication procedure is achieved in a 2-way handshake manner. When the authentication procedure is finished, the STA proceeds to an association procedure with respect to the AP.

The association procedure is achieved in a 2-way handshake manner. First, the STA transmits an association request frame to the AP. Capabilities information of the STA is included in the association request frame. On the basis of this information, the AP determines whether to permit the association with the STA. Upon determining whether to permit the association, the AP transmits an association response frame to the STA. The association response frame includes information indicating whether the association is permitted and information indicating a cause of an association permission/failure. The association response frame further includes information on capabilities supportable by the AP. If the association ends successfully, frames are normally exchanged between the AP and the STA. If the association fails, the association procedure is re-attempted on the basis of information regarding a failure cause included in the association response frame, or the STA may request another AP to associate therewith.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate.

With the widespread use of the WLAN and the diversification of applications using the WLAN, there is a recent demand for a new WLAN system to support a higher throughput than a data processing rate supported by the IEEE 802.11n. A WLAN system supporting a very high throughput (VHT) is a next version of the IEEE 802.11n WLAN system, and is one of IEEE 802.11 WLAN systems which have recently been proposed to support a data processing rate of 1 Gbps or higher as to multiple users or 500 Mbps or higher as to a single user in a MAC service access point (SAP).

Beyond the existing WLAN system supporting 20 MHz and 40 MHz, the VHT WLAN system intends to support bandwidth transmission of 80 MHz, contiguous 160 MHz, and non-contiguous 160 MHz and/or higher bandwidth transmission. In addition thereto, 256 quadrature amplitude modulation (QAM) is supported beyond the existing WLAN system supporting up to 64QAM.

Since the VHT WLAN system supports a multi user-multiple input multiple output (MU-MIMO) transmission method for a higher throughput, an AP may simultaneously transmit data frames to at least one or more STAs which are MIMO-paired. The maximum number of paired STAs may be 4. When the maximum number of spatial streams is 8, up to 4 spatial streams can be allocated to each STA.

Referring back to FIG. 1, in the WLAN system as shown in the drawing, the AP 10 can simultaneously transmit data to an STA group including at least one STA among a plurality of STAs 21, 22, 23, 24, and 30 associated with the AP 10. Although it is shown in FIG. 1 that the AP performs MU-MIMO transmission to the STAs, in a WLAN system supporting a tunneled direct link setup (TDLS) or direct link setup (DLS) and a mesh network, an STA which intends to transmit data can transmit a PLCP protocol data unit (PPDU) to the plurality of STAs by using the MU-MIMO transmission scheme. Hereinafter, a case where the AP transmits the PPDU to the plurality of STAs according to the MU-MIMO transmission scheme will be described for example.

Data to be transmitted to each STA can be transmitted through a different spatial stream. A data packet to be transmitted by the AP 10 is a PPDU generated and transmitted in a physical layer of the WLAN system or a data field included in a PPDU, and can be referred to as a frame. That is, the data field included in the PPDU for SU-MIMO and/or MU-MIMO can be called a MIMO packet. Among them, a PPDU for MU can be called a MU packet. It is assumed in the embodiment of the present invention that the STA1 21, the STA2 22, the STA3 23, and the STA4 24 belong to a transmission target STA group which is MU-MIMO paired with the AP 10. In this case, data may not be transmitted to a specific STA of the transmission target STA group since a spatial stream is not allocated thereto. Meanwhile, although the STAa 30 is associated with the AP, it is assumed that the STAa 30 is an STA not included in the transmission target STA group.

An identifier can be allocated to a transmission target STA group in order to support MU-MIMO transmission in the WLAN system, and such an identifier is called a group identifier (ID). The AP transmits a group ID management frame including group definition information for group ID allocation to STAs supporting MU-MIMO transmission. Accordingly, the group ID is allocated to STAs before PPDU transmission. A plurality of group IDs can be allocated to one STA.

Table 1 below shows an information element included in the group ID management frame.

TABLE 1

| order | information |
|---|---|
| 1 | category |
| 2 | VHT action |
| 3 | membership status |
| 4 | spatial stream position |

In the category field and the VHT action field, a frame corresponds to a management frame, and is configured to be able to identify a group ID management frame used in a next generation WLAN system supporting MU-MIMO.

As shown in Table 1, the group definition information includes membership status information indicating whether it belongs to a specific group ID, and if it belongs to the specific group ID, includes spatial stream location information indicating at which position a spatial stream set of a corresponding STA is located among all spatial streams based on MU-MIMO transmission.

Since one AP manages a plurality of group IDs, the membership status information provided to one STA needs to indicate whether an STA belongs to each group ID managed by the AP. Therefore, the membership status information can exist in an array format of sub-fields indicating whether it belongs to each group ID. Since the spatial stream location information indicates a location for each group ID, it can exist in an array format of sub-fields indicating a location of a spatial stream set occupied by an STA for each group ID. In addition, spatial stream information and membership status information for one group ID can be implemented in one sub-field.

When the AP transmits a PPDU to a plurality of STAs by using a MU-MIMO transmission scheme, the AP transmits the PPDU by inserting information indicating a group ID into the PPDU as control information. When the STA receives the PPDU, the STA confirms the group ID field and thus confirms whether the STA is a member STA of a transmission target STA group. If it is confirmed that the STA is the member of the transmission target STA group, the STA can determine at which position a spatial stream set to be transmitted to the STA is located among all spatial streams. Since the PPDU includes information indicating the number of spatial streams allocated to a reception STA, the STA can receive data by searching for spatial streams allocated to the STA.

Meanwhile, a TV white space (WS) has drawn attention as a frequency band that can be newly used in the WLAN system. The TV WS refers to a frequency band in an idle state which remains due to digitalization of analog TV of the U.S.A, and for example, may be a band in the range of 54 to 698 MHz. However, this is for exemplary purposes only, and thus the TV WS is a licensed band that can be preferentially used by a licensed user. The licensed user implies a user permitted to use the licensed band, and may also be called other terms, such as a licensed device, a primary user, an incumbent user, etc.

An AP and/or STA operating in the TV WS must provide a protection function for the licensed user. This is because the licensed user is preferential in the use of the TV WS band. For example, if a specific WS channel has already been used by the licensed user (e.g., a microphone) as a frequency band which is divided in protocol to have a specific bandwidth in the TV WS band, the AP and/or the STA cannot use a frequency band corresponding to the WS channel to protect the licensed user. In addition, when a frequency band used for current frame transmission and/or reception is used by the licensed user, the AP and/or the STA must stop the use of the frequency band.

Accordingly, the AP and/or the STA must first perform a procedure of determining whether a specific frequency band is available in the TV WS band, in other words, whether the licensed user exists in the frequency band. The determining of whether the licensed user exists in the specific frequency band is called spectrum sensing. As a spectrum sensing mechanism, an energy detection scheme, a signature detection scheme, etc., may be utilized. It may be determined that the band is used by the licensed user if a received signal has strength greater than or equal to a specific value, or it may be determined that the band is used by the licensed user if a DTV preamble is detected.

Figure 2:
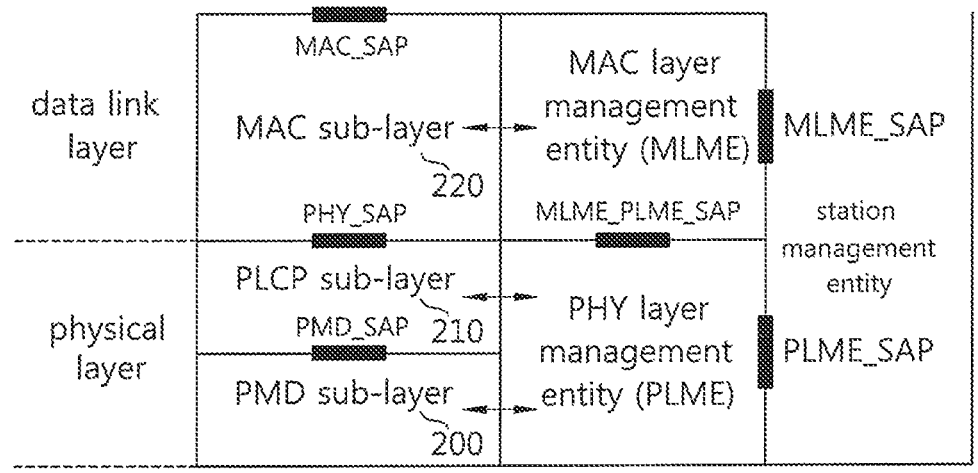
FIG. 2 shows a physical layer architecture of a WLAN system supported by institute of electrical and electronics engineers (IEEE) 802.11.

FIG. 2 shows a physical layer architecture of a WLAN system supported by IEEE 802.11.

The IEEE 802.11 PHY architecture includes a PHY layer management entity (PLME), a physical layer convergence procedure (PLCP) sub-layer 210, and a physical medium dependent (PMD) sub-layer 200. The PLME provides a PHY management function in cooperation with a MAC layer management entity (MLME). The PLCP sub-layer 210 located between a MAC sub-layer 220 and the PMD sub-layer 200 delivers to the PMD sub-layer 200 a MAC protocol data unit (MPDU) received from the MAC sub-layer 220 under the instruction of the MAC layer, or delivers to the MAC sub-layer 220 a frame received from the PMD sub-layer 200. The PMD sub-layer 200 is a lower layer of the PDCP sub-layer and serves to enable transmission and reception of a PHY entity between two STAs through a radio medium. The MPDU delivered by the MAC sub-layer 220 is referred to as a physical service data unit (PSDU) in the PLCP sub-layer 210. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 210 attaches an additional field including information required by a PHY transceiver to the PSDU in a process of receiving the PSDU from the MAC sub-layer 220 and delivering it to the PMD sub-layer 200. The additional field attached to the PSDU in this case may be a PLCP preamble, a PLCP header, tail bits required to reset an convolution encoder to a zero state, etc. The PLCP sub-layer 210 receives a TXVECTOR parameter delivered from the MAC sub-layer. The TXVECTOR parameter includes control information required to generate and transmit a PLCP protocol data unit (PPDU) and control information required by the reception STA to receive and interpret the PPDU. The PLCP sub-layer 210 uses information included in the TXVECTOR parameter when generating the PPDU including the PSDU.

The PLCP preamble serves to allow a receiver to prepare a synchronization function and antenna diversity before the PSDU is transmitted. The data field may include padding bits in the PSDU, a service field including a bit sequence for initializing a scrambler, and a coded sequence obtained by encoding a bit sequence to which tail bits are attached. In this case, either binary convolutional coding (BCC) encoding or low density parity check (LDPC) encoding can be selected as an encoding scheme according to an encoding scheme supported in an STA that receives the PPDU. The PLCP header includes a field that contains information on a PPDU to be transmitted.

The PLCP sub-layer 210 generates a PPDU by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data. The PLCP sub-layer of the reception STA delivers an RXVECTOR including control information included in a PLCP preamble and a PLCP header to the MAC sub-layer so that the PPDU can be interpreted and data can be acquired in a reception state.

Meanwhile, the STA discovers a service to receive the service provided from the AP and/or another STA. The service discovery procedure is preferable when a speed is faster and power consumption is smaller. Herein, the service may imply an application (e.g., File Transfer Protocol (FTP), Voice over Internet Protocol (VoIP), etc.) provided by various communication objects on the network, and in a broader concept, may imply contents such as a file or may imply a device itself.

In the infrastructure BSS, the STA acquires information on the service by querying the service via the AP. In this case, the service must be registered to the AP (or a registered server, etc.). In a place other than the infrastructure BSS, the STA may acquire the information on the service by scanning a radio channel. In this case, the information on the service may be announced periodically by a service provider.

Figure 3:
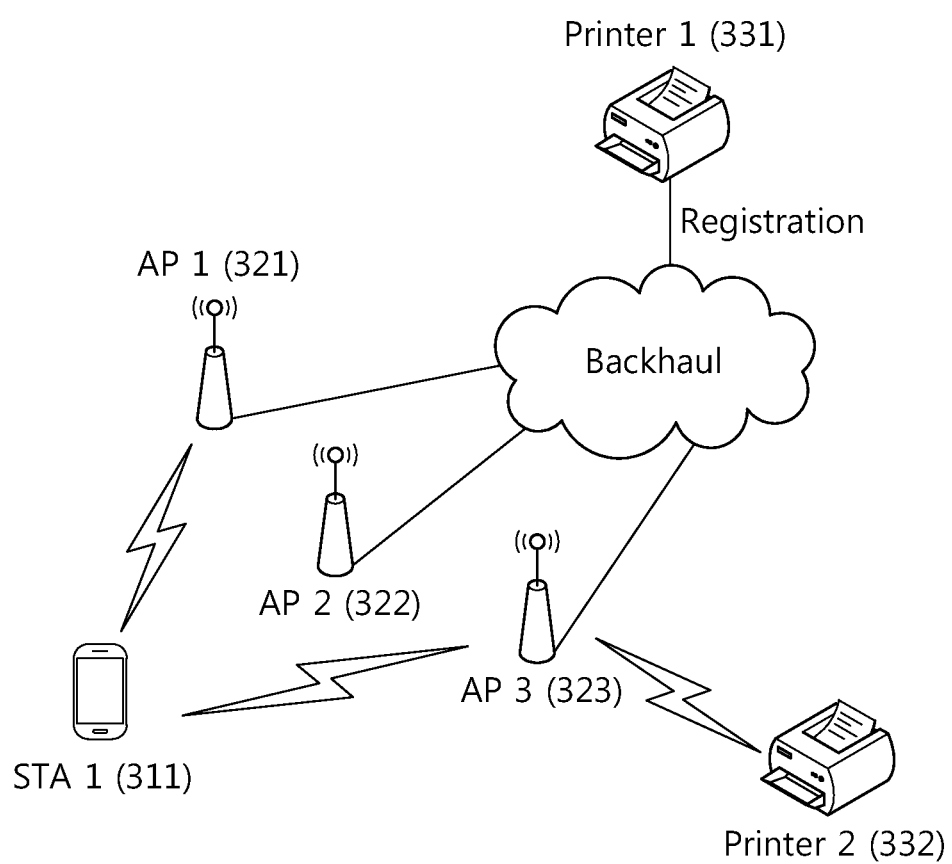
FIG. 3 shows an example of an infrastructure basic service set (BSS) environment to which a service discovery method performed by a station (STA) is applicable.

FIG. 3 shows an example of an infrastructure BSS environment to which a service discovery method performed by an STA is applicable. It is assumed in FIG. 3 that a service to be discovered by the STA is a printer service. An object capable of providing the printer service is indicated by a printer.

Referring to FIG. 3, like a printer1 331, the printer may be connected via a backhaul network, or like a printer2 332, the printer may be associated with an AP3 323 and thus may be connected via the AP3 323. If the printer1 331 and the printer2 332 are registered to the AP3 323 and if the printer1 331 is registered to the AP1 321, an STA1 311 may discover the printer service via the AP1 321 and the AP3 323.

In case of an infrastructure BSS, the service discovery procedure may start by querying a service desired by the STA. Upon receiving the query of the STA, the AP examines whether the service is registered to the AP itself. If the service is registered to the AP itself, information of a provider of the registered service and a service type are announced to the STA. If the service discovery is complete, the STA acquires service provider information from the AP. Accordingly, the STA can be associated with the service provider and can request the service.

In the infrastructure BSS, the service discovery by the STA may be performed on the basis of a generic advertisement service (GAS) protocol. That is, the STA may request the AP to perform the service discovery on the basis of the GAS protocol, and may acquire service related information from the AP. When the GAS protocol is used, there is an advantage in that the STA can acquire information related to a network connected to the AP before setting up a link with the AP.

The STA supporting the GAS protocol may include an interworking element into a beacon frame and a probe response frame.

An advertisement protocol ID supported by the STA may be transmitted by using an advertisement protocol element.

Figure 4:
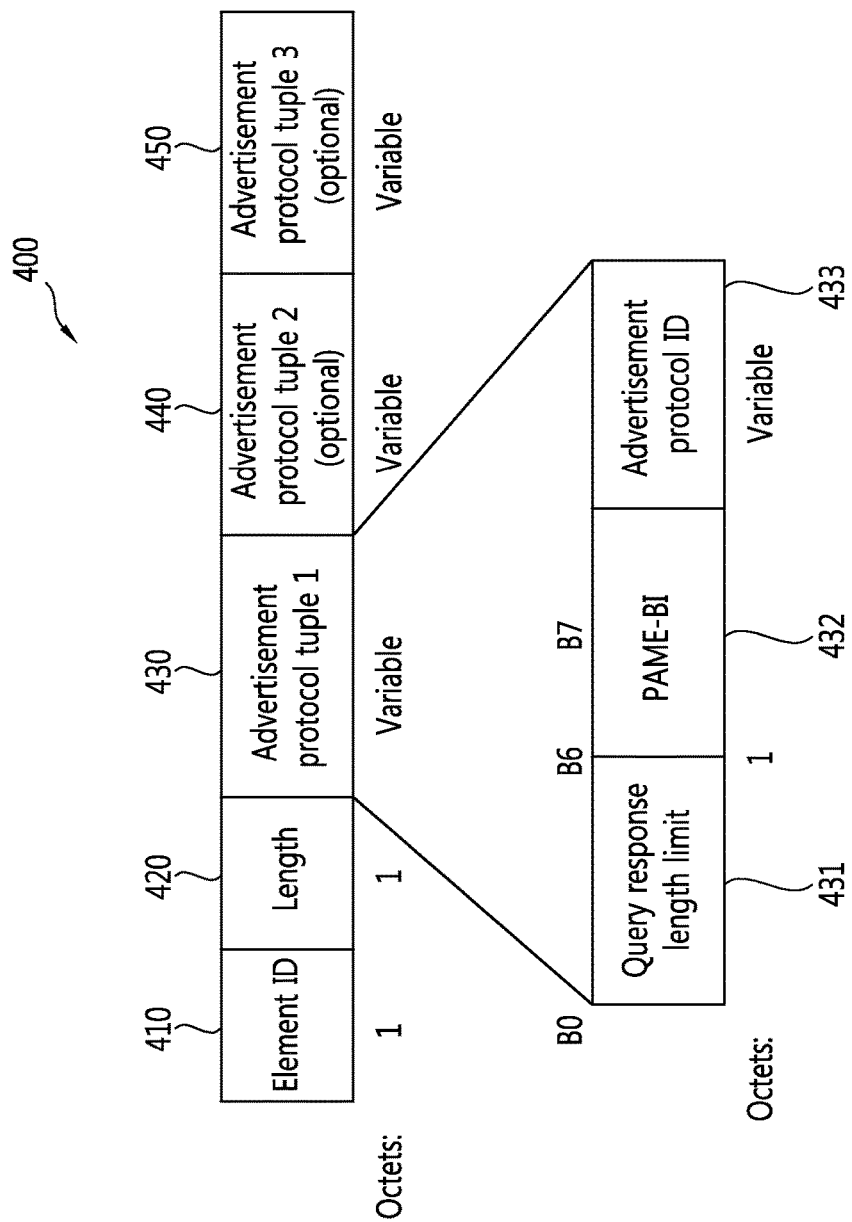
FIG. 4 is a block diagram showing a format of an advertisement protocol element according to an embodiment of the present invention.

FIG. 4 is a block diagram showing a format of an advertisement protocol element according to an embodiment of the present invention.

Referring to FIG. 4, an advertisement protocol element 400 includes an element ID field 410, a length field 420, and at least one advertisement protocol tuple fields 430, 440, and 450.

The element ID field 410 may be configured to indicate that a corresponding information element is an advertisement protocol element.

The length field 420 may be configured to indicate a total length of at least one advertisement protocol tuple field included in the advertisement protocol element 400 subsequent thereto.

The advertisement protocol tuple field 430 may include a query response length limit sub-field 431, a PAME-BI (Pre-Association Message Exchange BSSID Independent) sub-field 432, and an advertisement protocol ID sub-field 433.

The query response length limit sub-field 431 indicates a maximum length of a query response.

The PAME-BI sub-field 432 may indicate whether an advertisement server will return an independent query response and a BSSID used to exchange a GAS frame.

The advertisement protocol ID sub-field 433 may indicate an advertisement protocol supported by the STA. For example, if the advertisement protocol ID sub-field 433 is set to '0', it may imply that the STA supports a registered service query protocol (RSQP).

Upon receiving an RSQP query request from the STA, the AP may proxy a query to a server located on an external network, or may send service information as an RSQP query response by utilizing local information included in the AP.

The STA transmits a GAS initial request frame to acquire the service information from the AP. The GAS initial request frame may be transmitted to the AP in a unicast or broadcast manner. The GAS initial request frame may be implemented by Table 2 below.

TABLE 2

| Order | Information |
| --- | --- |
| 1 | Category |
| 2 | Action |
| 3 | Dialog Token |
| 4 | Advertisement protocol element |
| 5 | Query Request Length |
| 6 | Query Request |

The category field may be configured to indicate that a corresponding frame is a public action frame. The action field may be configured to indicate that a corresponding frame is a GAS initial request frame.

The dialog token field includes information used to match a request of a specific action and a response for the specific action request.

The advertisement protocol element may have the aforementioned format of FIG. 4, and may be configured to indicate the RSQP. In this case, an advertisement protocol ID included in the advertisement protocol element may be set to '0'.

The query request length field may be configured to indicate a length of a query request field.

Figure 5:
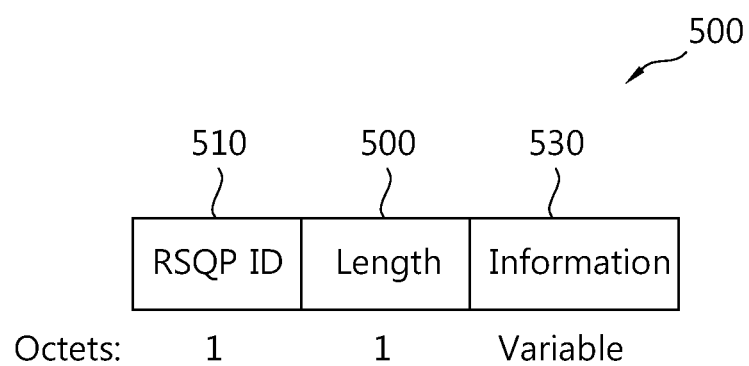
FIG. 5 is a block diagram showing a format of a registered service query protocol (RSQP) element according to an embodiment of the present invention.

The query request field may include an RSQP element of FIG. 5.

FIG. 5 is a block diagram showing a format of an RSQP element according to an embodiment of the present invention.

Referring to FIG. 5, an RSQP element 500 may include an RSQP ID field 510, a length field 520, and an information field 530.

The RSQP ID field 510 may include an identifier to identify an RSQP by a query request of an STA.

The length field 520 may be configured to indicate a length of the information field 530.

The information field 530 may include detailed information related to the RSQP based on the query request of the STA.

Upon receiving a GAS initial request frame from the STA, an AP transmits a GAS initial response frame to the STA. The GAS initial response frame may be implemented by Table 3 below.

TABLE 3

| Order | Information |
| --- | --- |
| 1 | Category |
| 2 | Action |
| 3 | Dialog Token |
| 4 | Status Code |
| 5 | GAS Comeback Delay |
| 6 | Advertisement Protocol element |
| 7 | Query Response Length |
| 8 | Query Response (Optional) |

The category field may be configured to indicate that a corresponding frame is a public action frame. The action field may be configured to indicate that a corresponding frame is a GAS initial request frame.

The dialog token field includes information used to match a request of a specific action and a response for the specific action request.

The status code may be configured to indicate a response status for the GAS initial request frame of the GAS initial response frame.

The GAS comeback delay field may be configured to indicate a time which is delayed when the GAS initial response frame is transmitted in response to the GAS initial request frame.

The advertisement protocol element may be implemented as shown in FIG. 4.

The query response length field may be configured to indicate a length of a query response field.

The query response field may include the format of the RSQP element of FIG. 5.

Figure 6:
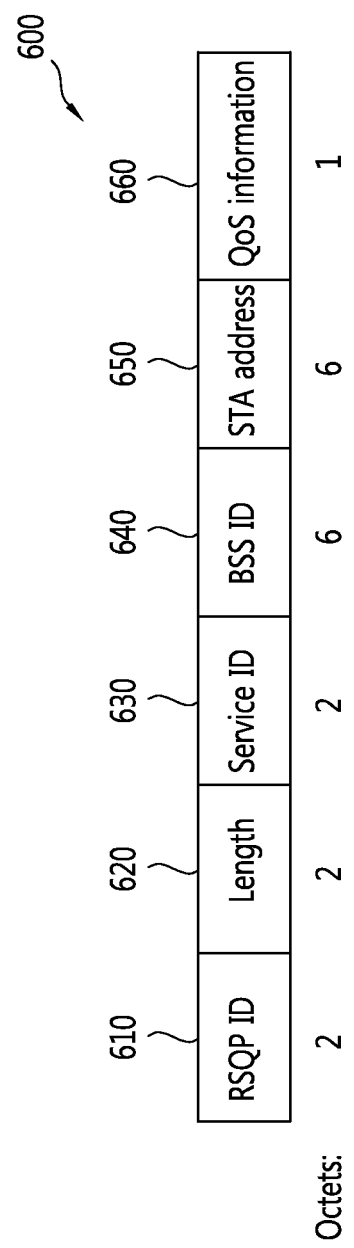
FIG. 6 shows a format of a service discovery element according to an embodiment of the present invention.

Meanwhile, if the query request field of the GAS initial request frame and the GAS initial response frame are related to service discovery information, the RSQP element included in the query request field and/or the query response field may be implemented as shown in FIG. 6 below. In this case, the RSQP element may be called a service discovery element.

FIG. 6 shows a format of a service discovery element according to an embodiment of the present invention.

Referring to FIG. 6, a service discovery element 600 may include an RSQP ID field 610, a length field 620, a service ID field 630, a BSSID field 640, an STA address field 650, and a QoS information field 660.

The RSQP ID field 610 may include information for identifying a service discovery element requested or responded by an STA. For example, an RSQP ID for the service discovery element requested by the STA may be implemented in the same manner as the RSQP ID for the service discovery element which is a response thereof.

The length field 620 may be configured to indicate a length of fields included in the service discovery element 600 subsequent to the length field 620.

The service ID field 630 may include information for identifying a service queried by a UE which transmits a GAS initial request frame.

The BSSID field 640 may indicate a 'Null' value or may be implemented as a random bit-sequence in case of the GAS initial request frame, whereas in case of the GAS initial response frame, may include a BSSID of an STA which provides a service indicated by the service ID field 630.

The STA address field 650 may be configured to indicate a MAC address of an STA which transmits the GAS initial request frame or to indicate a MAC address of an STA which transmits the GAS initial response frame and/or an STA which provides a requested service indicated by the service ID field 630.

The QoS information field 660 may include load information of an STA which provides a service corresponding to a service ID, information related to an expected throughput, and/or information related to a queue.

Upon receiving the GAS initial request frame including the aforementioned information, the AP transmits the GAS initial response frame to the STA if a service queried by the STA is registered to the AP itself. On the other hand, if not registered, there may be no response.

An STA which intends to discover a service through an RSQP by transmitting the GAS initial request frame may wait for the response during a time of an RSQP response time-over after the transmission, and if there is no response during a corresponding time, may determine that the discovery of the service has failed.

The service discovery method according to the aforementioned embodiment of the present invention with reference to FIG. 3 to FIG. 6 is performed through a frame exchange with the AP in the infrastructure BSS. That is, even if an STA is not yet associated with a specific AP, the STA can request the AP to announce a registered service on the basis of a GAS protocol. Therefore, the STA can acquire information related to a supported service.

In a WLAN environment in which a central management entity such as an AP is not present, for example, in a WLAN environment such as an IBSS, it may be proposed a method in which a service is announced through signaling between STAs and the service to be provided is discovered on the basis of signaling information.

Figure 7:
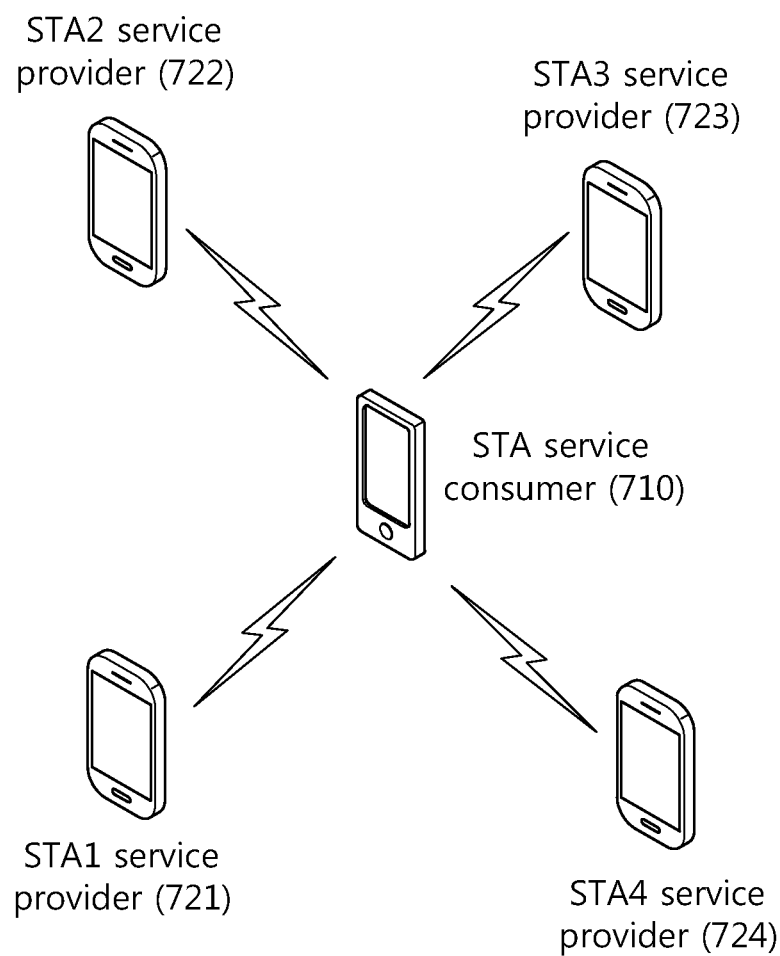
FIG. 7 shows an example of a WLAN environment to which a service discovery method is applicable according to an embodiment of the present invention.

FIG. 7 shows an example of a WLAN environment to which a service discovery method is applicable according to an embodiment of the present invention.

Referring to FIG. 7, it may be assumed a WLAN environment in which several STAs 710, 721, 722, 723, and 724 are located in specific places in a distributed manner, and any STA, i.e., the STA 710, desires to discover a specific service such as a printer service. In this case, an object which provides a service may be called a service provider, and an object which intends to use the service may be called a service consumer.

The service provider may operate in a power-save mode, and different service providers may operate in respective different channels. Therefore, the service consumer can be associated with an STA which has a position of the service provider only when the service consumer knows about who is the service provider capable of providing a service desired by the service consumer and about when and in which channel it operates by entering an awake state.

For this, the STAs 721, 722, 723, and 724 which have a position of the service provider may periodically broadcast a service announcement frame. In this case, a transmission period of the service announcement frame is called a service announcement interval. An STA which is a service provider operating in a power-save mode may enter the awake state from a sleep state according to the service announcement interval. The service provider sequentially scans each channel before transmitting the service announcement frame. In this case, a time duration in which scanning is performed is called a service scanning time. The service announcement interval may be set to be less than the service scanning time. If the service announcement interval is set to be greater than the service scanning time duration, the service announcement frame is not transmitted during the scanning duration, and thus it may not be possible to discover a corresponding service.

If the service announcement frame is not received in any channel when the service provider completes scanning for all available channels, a channel for transmitting the service announcement frame can be selected by the service provider. When the channel is selected, the service announcement frame may be broadcast with a period of a service announcement interval in the selected channel.

Figure 8:
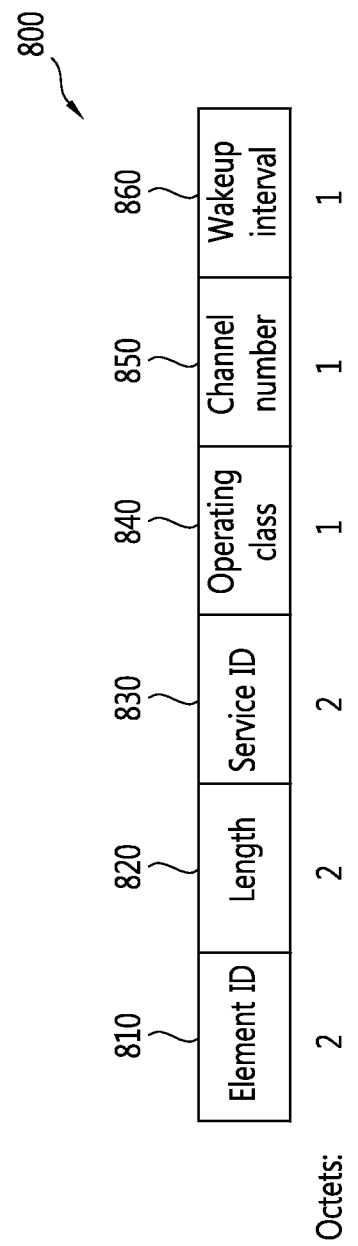
FIG. 8 is a block diagram showing a format of a service announcement information element included in a service announcement frame according to an embodiment of the present invention.

FIG. 8 is a block diagram showing a format of a service announcement information element included in a service announcement frame according to an embodiment of the present invention.

Referring to FIG. 8, a service announcement information element 800 may include an element ID field 810, a length field 820, a service ID field 830, an operating class field 840, a channel number field 850, and a wakeup interval field 860.

The element ID field 810 may be configured to a value indicating that a corresponding information element is a service announcement information element.

The length field 820 may be configured to indicate a length of fields included in the service announcement information element 800 subsequent to the length field 820.

The service ID field 830 may include information capable of identifying a service provided by a service provider. The identification information may be implemented with a unique number corresponding to a service to be provided.

The operating class field 840 and the channel number field 850 may be configured to indicate a frequency and bandwidth of a channel to be used by a service provider who transmits a service announcement frame including the service announcement information element 800. A channel through which the service provider actually provides a service may be identified by using the operating class field 840 and the channel number field 850.

If the service provider who provides a service announcement frame operates in a power-save mode in a corresponding channel, the wakeup interval field 860 may be configured to indicate a time of initially entering an awake state and a period of entering the awake state.

A service consumer scans a channel to acquire service information. Upon receiving the service announcement frame during the scanning procedure is performed, the service consumer determines whether a service ID of the service announcement frame corresponds to a service to be discovered by the service consumer. If the service ID corresponds to the service to be described, an association with a service provider who transmits the service announcement frame may be attempted by switching to a channel indicated by the channel number field of the service announcement frame.

Since each service provider performs scanning on the basis of its local clock in a scanning procedure, MAC synchronization may not be achieved in each scanning duration. This will be described below with reference to the accompanying drawings.

Figure 9:
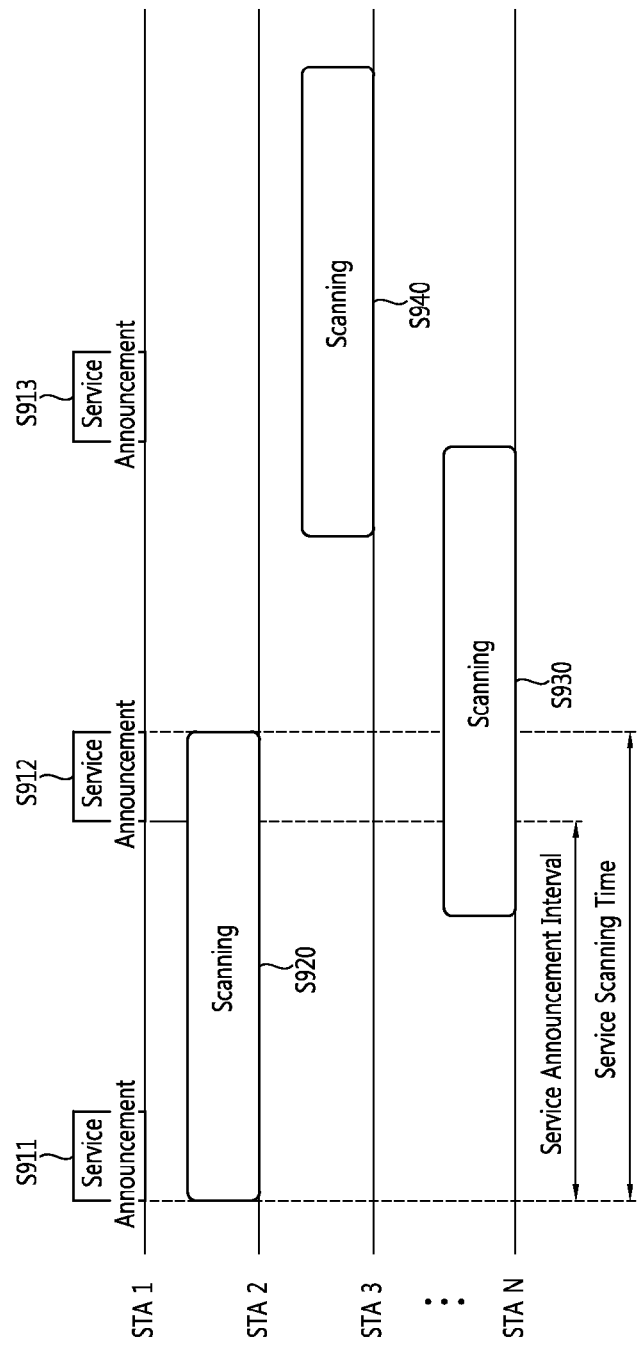
FIG. 9 shows an example of a channel scanning procedure according to an embodiment of the present invention.

FIG. 9 shows an example of a channel scanning procedure according to an embodiment of the present invention. The scanning procedure of FIG. 9 is performed by at least one STA with respect to a specific channel (herein, an $m^{th}$ channel is assumed).

It is assumed a communication environment in which one or more service providers are present in a WLAN system and scanning is simultaneously achieved by each service provider. In addition, it is also assumed that the number of available channels is M, and scanning is performed sequentially starting from a $1^{st}$ channel. It is assumed that an STA 1 to an STA N are all service providers, and are located within a transmission coverage.

Referring to FIG. 9, first, the STA 1 completes scanning for all channels, and selects the $m^{th}$ channel to start the transmission of a service announcement frame (step S911). The STA 1 may enter an awake state with a period of a service announcement interval to transmit the service announcement frame (steps S912 and S913).

Next, the STA 2 completes scanning of an $(m-1)^{th}$ channel, and performs scanning by switching to the $m^{th}$ channel (step S920). In this case, the STA 2 receives the service announcement frame transmitted by the STA 1. Subsequently, the STA N performs scanning (step S930), and the STA 3 performs scanning (step S940).

Each STA which performs scanning may perform channel scanning during a service scanning time.

The service announcement frame may be transmitted in any channel selected by the service provider, but may be restrictively transmitted only in a specific channel set. For example, a first channel and a second channel may be defined as a control channel, and it may be configured such that the service announcement frame is transmitted only through a corresponding channel. The number of control channels may be fixed, and may be flexibly regulated according to the number of service providers or the number of services to be provided. In addition, it may be configured such that different channels are allocated according to a service category for distinction. When the service consumer wants to discover a service, the service discovery may be possible by only scanning a control channel.

If a plurality of service providers are present, it may be preferable to perform transmission in a concentrated manner through one channel or a small number of channels, rather than transmitting the service announcement frame through a great number of channels. This is because, if not, an overhead may be significant in the service discovery to scan all channels for a long period of time. In the same reason, a data channel which is a channel through which data is transmitted is preferably managed by being separated from a control channel which is a channel through which the service announcement frame is transmitted.

For this, when a service provider who intends to announce a service discovers a different service provider, it may be configured such that a service announcement frame is transmitted through the same channel. While performing scanning, the service provider may receive a service announcement frame which is broadcast by the different service provider. In this case, the service provider may receive the service announcement frame which is broadcast by the different service provider in a corresponding channel, and may transmit the service announcement frame by performing random backoff after observing a channel state during a DIFS (DCF (Distributed Coordination Function) Interframe Space). However, the DIFS is only an example of a time value that can be used to observe the channel state, and thus SIFS(Short Interframe Space) and PIFS (PCF (Point Coordination Function) Interframe Space) may also be used in addition to the DIFS. Further, any time value may also be used.

Figure 10:
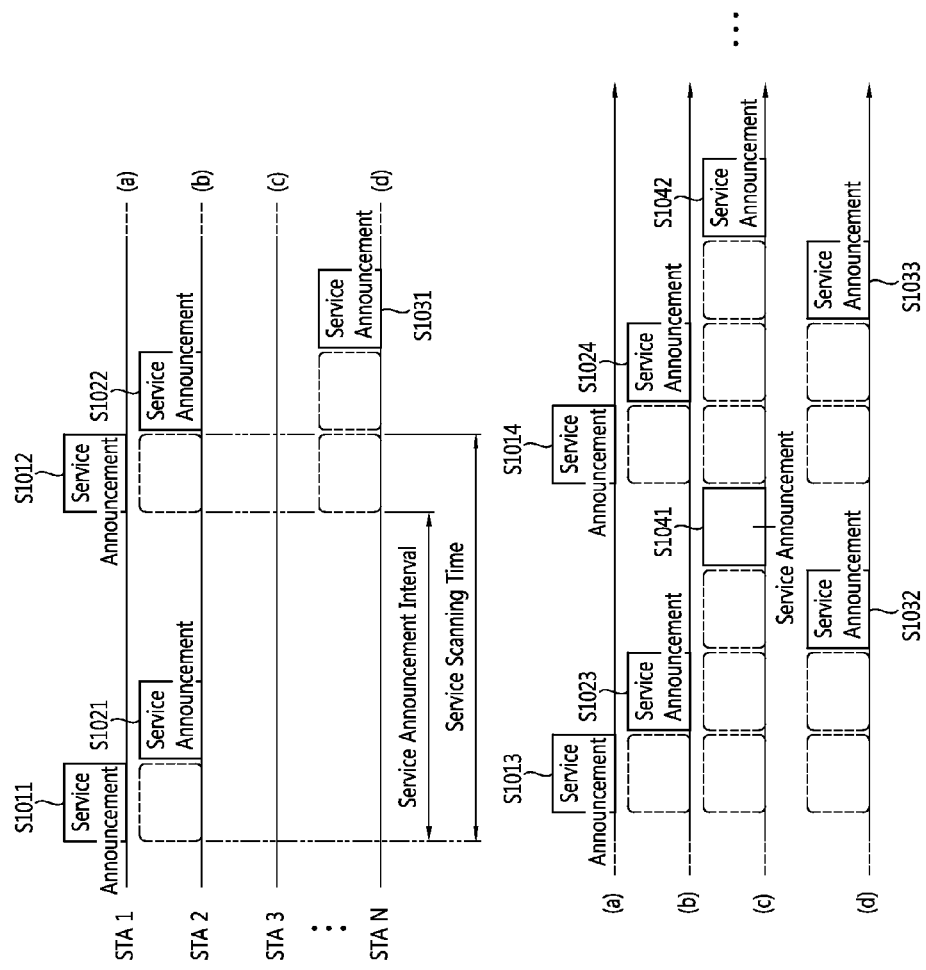
FIG. 10 shows an example of a channel usage on the basis of a service announcement frame transmission method according to an embodiment of the present invention.

FIG. 10 shows an example of a channel usage on the basis of a service announcement frame transmission method according to an embodiment of the present invention.

Referring to FIG. 10, an STA 1 to an STA N transmit a service announcement frame by varying a transmission time in one channel. In the present embodiment, it may be configured such that each STA operates in a power-save mode, enters an awake state at a time of transmitting the service announcement frame, and enters a sleep state after transmitting the service announcement frame.

In a situation where the STA 1 broadcasts the service announcement frame with a period of a service announcement interval (steps S1011, S1012, S1013, S1014), the STA 2 may detect that the STA 1 broadcasts the service announcement frame through scanning. Therefore, after the STA 1 transmits the service announcement frame, the STA 2 may wait for a DIFS and perform random backoff and may transmit the service announcement frame (steps S1021, S1022, S1023, S1024). A period by which the STA 2 transmits the service announcement frame may be set equally to a service announcement interval which is a period by which the STA 1 transmits the service announcement frame.

Subsequently, through scanning, the STA N may detect that respective service announcement frames are transmitted by the STA 1 and the STA 2. Therefore, after the service announcement frame is transmitted by the STA 1 and the service announcement frame is transmitted through the STA 2, the STA N may transmit a service announcement frame (steps S1031, S1032, S1033). A time at which the STA N starts the transmission of the service announcement frame may be a time at which a channel access is achieved by waiting for the DIFS and/or by performing the random backoff after the service announcement frames are detected by the STA 1 and the STA 2. A period by which the STA N transmits the service announcement frame may be set equally to a period by which the STA 1 and the STA 2 transmit the service announcement frames.

An STA 3 may detect through scanning that the respective service announcement frames are transmitted by the STA 1, the STA 2, and the STA N. Therefore, the STA 3 may transmit a service announcement frame after the service announcement frames are transmitted by the STA 1, the STA 2, and the STA 3 (step S1041, S1042). A time at which the STA 3 starts to transmit the service announcement frame may be a time at which a channel access is achieved by waiting for the DIFS and/or by performing the random backoff after the service announcement frames are detected by the STAs. A period by which the STA 3 transmits the service announcement frame may be set equally to a period by which the STA 1, the STA 2, and the STA N transmit the service announcement frames.

Meanwhile, both the service announcement interval and the power consumption have a trade-off relation. When the interval is long, a service provider consumes less power, and a channel switching overhead with a data channel is also decreased. Therefore, if a plurality of service providers are present, each service provider may transmit, in turn, a service announcement frame by representing all or several service providers. For example, if the service announcement frame is transmitted one time by each of three service providers, each service provider may be configured not to transmit the service announcement frame during the other two service providers transmit the service announcement frames.

In order for each service provider to announce, in turn, its service information and service information of other service providers, there is a need to provide a service announcement format which can include up to service information of the other service providers. For this, a service announcement information element having a format of FIG. 11 may be proposed.

Figure 11:
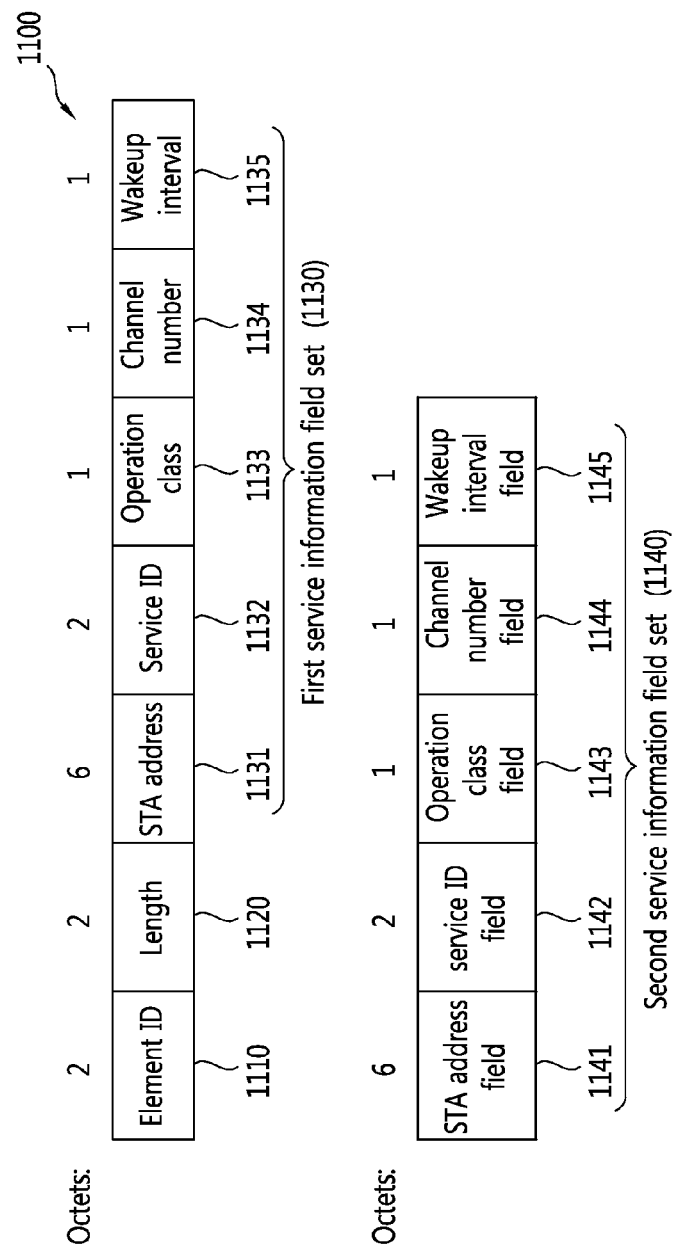
FIG. 11 is a block diagram showing a service announcement information element format according to another embodiment of the present invention.

FIG. 11 is a block diagram showing a service announcement information element format according to another embodiment of the present invention.

Referring to FIG. 11, a service announcement information element 1100 may include an element ID field 1110, a length field 1120, and at least one or more service information field sets 1130 and 1140.

The element ID field 1110 may be configured to indicate that a corresponding information element is the service announcement information element. The length field 1120 may be configured to indicate a length of fields included in the service announcement information element 1100 subsequent to the length field 1120.

The at least one or more service information field sets 1130 and 1140 may be configured to include service information to be announced by each specific service provider. The first service information field set 1130 may include service information of a service provider who transmits the service announcement information element 1100. The second service information field set 1140 may include different service provider's service information acquired by the service provider.

The first service information field set 1130 may include an STA address field 1131, a service ID field 1132, an operation class field 1133, a channel number field 1134, and a wakeup interval field 1135. The STA address field 1131 may be configured to indicate a MAC address of the service provider. The service ID field 1132 may include information capable of identifying a service provided by the service provider. The service ID field 1132 may be implemented with a unique number corresponding to the provided service. The operation class field 1133 and the channel number field 1134 may be configured to indicate a frequency and bandwidth of a channel to be used by a service provider who intends to announce service information through the first service information field set 1130. A channel through which an STA, i.e., a service provider, actually provides a service may be identified by using the operation class field 1133 and the channel number field 1134.

The second service information field set 1140 may be configured to include the same fields as the first service information field set 1130. That is, the second service information field set 1140 may be configured to repeat fields constituting the first service information field set 1130. However, the second service information field set 1140 may be configured to include information related to a service provided by a different service provider other than the service provider.

The second service information field set 1140 may include an STA address field 1141, a service ID field 1142, an operation class field 1143, a channel number field 1144, and a wakeup interval field 1145. The STA address field 1141 may be configured to indicate a MAC address of a different service provider. The service ID field 1142 may include information capable of identifying a service provided by the different service provider. The service ID field 1142 may be implemented with a unique number corresponding to the provided service. The operation class field 1143 and the channel number field 1144 may be configured to indicate a frequency and bandwidth of a channel to be used by a service provider who intends to announce service information through the second service information field set 1140. A channel through which an STA, i.e., a service provider, actually provides a service may be identified by using the operation class field 1143 and the channel number field 1144.

Meanwhile, the second service information field set 1140 may be included in the service announcement information element 1100 only when the service provider acquires service information by receiving a service announcement information frame transmitted by a different service provider. In addition, upon acquiring the service information from the different service provider, the service provider may perform transmission by including a third service information field set to the service announcement information element.

Fields related to one piece of service information are included in each of the first service information field set 1130 and the second service information field set 1140. However, if the service provider provides a plurality of services, the service ID field, operation class field, channel number field, and wakeup interval field of the service information field set may be included repetitively, and the fields may include information related to another service.

Hereinafter, a service announcement method using the aforementioned service announcement frame will be described in detail.

A service provider broadcasts a service announcement frame with a period of a service announcement interval. When a service announcement time arrives, a channel may be observed during a channel observation time (e.g., DIFS), and thereafter, if in an idle state where the channel is not occupied, the service announcement frame may be transmitted. If the channel is occupied or a plurality of service providers intend to access thereto, the service announcement frame may be transmitted after acquiring a channel access right though random backoff.

If an STA which is currently scanning the channel to transmit the service announcement frame receives a service announcement frame of a different service provider, the service announcement frame is transmitted in this channel. In this case, the transmission of the service announcement frame is different from a typical case where a frame is transmitted according to a service announcement interval. A service provider who receives the service announcement frame transmitted from the different service provider observes the channel during a time (e.g., PIFS or SIFS) shorter than a typical channel observation time at a next announcement time, and if the channel is in the idle state, transmits the service announcement frame. Meanwhile, if a plurality of service providers intend to access to the channel after waiting for the PIFS, the random backoff is performed, and in this case, in order to assign a different channel observation time (i.e., contention waiting time) between the service providers, a contention window for a different random backoff may be assigned between the service providers.

The service announcement frame may include both of service information of a service announcement frame received in a previous announcement duration and service information to be announced by the service provider. That is, upon receiving the service announcement frame transmitted from the different service provider, the service provider may confirm included service information to configure and/or reconfigure a service announcement frame to be transmitted by the service provider. A format of the service announcement frame may use the format of FIG. 11.

In this case, the service announcement interval may be configured by the following equation.

Service announcement interval=(the number of different service providers related to service information included in the received service announcement frame+1)* unit service announcement interval  [Equation 2]

However, the unit service announcement interval may be a service announcement interval which is configured when the service provider transmits service information by including only the service information provided by the service provider itself to the service announcement frame.

The service provider who receives the service announcement frame including service information provided by a new service provider increases the service announcement interval by the unit service announcement interval from a current value. Then, the channel may be observed during a time (e.g., PIFS or SIFS) shorter than a typical channel observation time at a next announcement time, and the service announcement frame may be transmitted. Meanwhile, if the service announcement frame including the service information provided by the new service provider is received by a plurality of service providers, each service provider observes the channel during the aforementioned time shorter than the typical channel observation time, acquires the channel access right through random backoff, and thereafter transmits the service announcement frame. The service announcement frame includes the service information of the service announcement frame of the different service provider, received from a previous announcement duration, and service information to be announced by the service provider. A format of the service announcement frame to be transmitted may use the format of FIG. 11. Thereafter, the service provider periodically enters an awake state with a period of the increased service announcement interval, and observes a channel on the basis of a typical channel observation time (e.g., DIFS).

The service provider who enters the awake state at a time at which the service announcement frame is to be transmitted first receives the service announcement frame of the different service provider because a newly joined service provider has a transmission priority. This is because the newly joined service provider receives the service announcement frame of the different service provider at a time at which the service announcement frame is previously intended to be transmitted and thereafter performs channel observation on the basis of a shorter channel observation time (e.g., PIFS or SIFS), and thus is capable of acquiring the channel access right preferentially.

If the newly joined service provider preferentially acquires the channel in the next announcement duration and transmits the service announcement frame, a service provider who is newly joined at this time and a service provider who enters the awake state at a corresponding time simultaneously receive the transmitted service announcement frame. In this case, a collision may occur in a next announcement duration since two service providers have the same priority. Therefore, a channel observation time may be regulated between the two, and random backoff may be additionally performed, thereby avoiding the collision. For example, a final channel observation time of an STA which enters the awake state may be set to PIFS+random[0, CWmin] (herein, CWmin implies a minimum value of a contention window).

Figure 12:
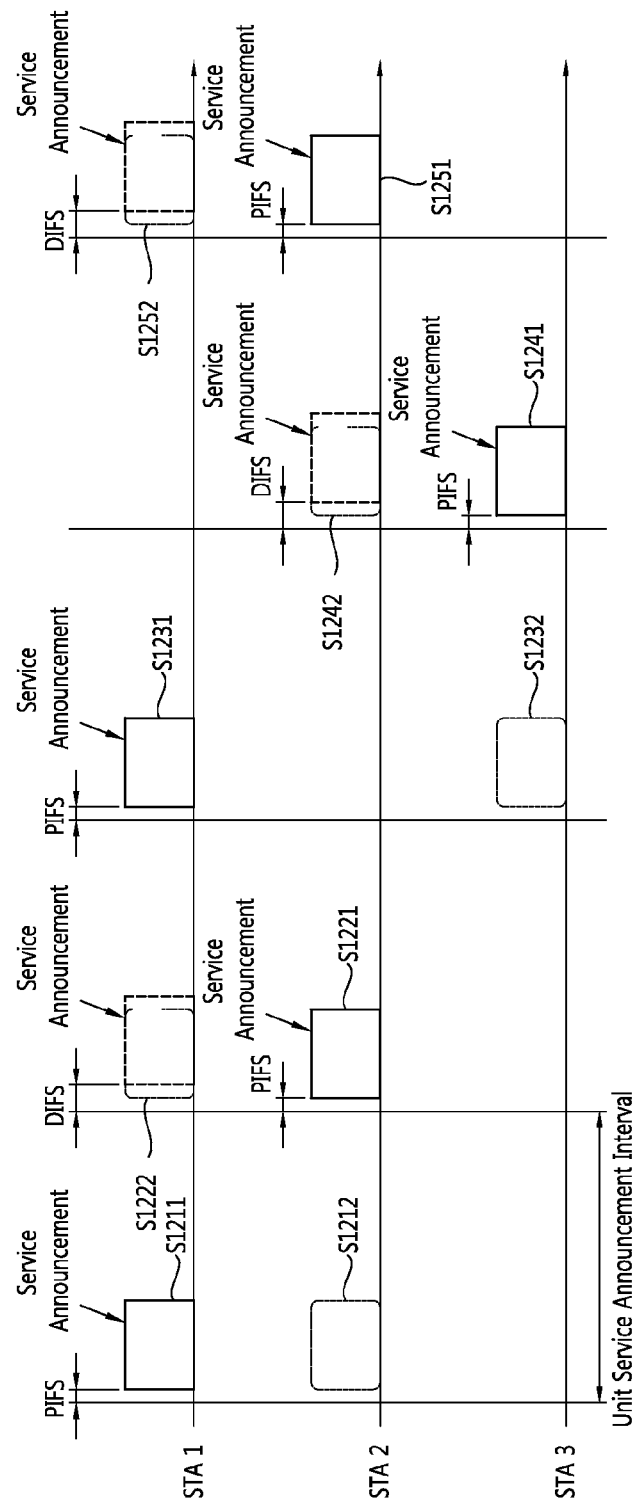
FIG. 12 shows an example of a service announcement method according to an embodiment of the present invention.

The service announcement method according to the aforementioned embodiment may be performed as shown in FIG. 12.

FIG. 12 shows an example of a service announcement method according to an embodiment of the present invention.

Referring to FIG. 12, if an STA 1 is only one service provider, a service announcement interval is configured to a unit service announcement interval, and a service announcement frame is transmitted (step S1211).

An STA 2 receives the service announcement frame of the STA 1 (step S1212). Therefore, the STA 2 observes a channel state on the basis of a PIFS which is a short channel observation time at a next announcement time, and thus acquires a channel access right and transmits the service announcement frame (step S1221). The service announcement frame transmitted by the STA 2 may include service information included in the service announcement frame of the STA 1, received in step S1212, and service information to be announced by the STA 2. The STA 2 may configure the service announcement interval to '2*unit service announcement interval', and may transmit the service announcement frame. After transmitting the service announcement frame, the STA 2 may enter a sleep state.

Meanwhile, the STA 1 which does not know the existence of the STA 2 enters an awake state according to an original service announcement interval and observes a channel state on the basis of the DIFS which is a typical channel observation time to transmit the service announcement frame. Therefore, the STA 1 fails to acquire the channel access right, and receives the service announcement frame transmitted from the STA 2 and enters the sleep state (step S1222). The STA 1 does not transmit the service announcement frame, and configures the service announcement interval to '2*unit service announcement interval'. Accordingly, the STA 1 and the STA 2 configure the service announcement interval to '2*unit service announcement interval', and thus transmit the service announcement frame while operating by transitioning between the sleep state and the awake state.

According to the configured service announcement interval, at a next announcement time, the STA 1 enters the awake state, acquires the channel access right, and transmits the service announcement frame (step S1231). The STA 1 may observe a channel state on the basis of the PIFS to acquire the channel access right for the transmission of the service announcement frame. The service announcement frame may include service information of the STA 1 and service information of the STA 2. The STA 1 which transmits the service announcement frame enters the sleep state.

The STA 3 receives a service announcement frame transmitted by the STA 1 (step S1232). Therefore, the STA 3 may configure the service announcement interval to '3*unit service announcement interval', and may generate the service announcement frame including service information of the STA 1 and the STA 2, included in the received service announcement frame, and service information to be announced by the STA 3.

At a next announcement time, the STA 3 enters the awake state, observes a channel state on the basis of a PIFS to acquire the channel access right, and transmits the service announcement frame (step S1241). The service announcement frame may include service information of all of the STA 1, the STA 2, and the STA 3.

In step S1221, the STA 2 may transmit the service announcement frame, and after the service announcement interval elapses, may re-enter the awake state to attempt the transmission of the service announcement frame. For this, the STA 2 intends to observe a channel on the basis of the DIFS and to acquire the channel access right. Accordingly, the channel access right cannot be acquired due to the STA 3 which observes the channel on the basis of the PIFS, and the service announcement frame transmitted from the STA 3 is received (step S1242). The STA 2 may configure the service announcement interval to '3*unit service announcement interval', and may include the service information of the STA 1, the STA 2, and the STA 3 to the service announcement frame. Upon receiving the service announcement frame, the STA 2 enters the sleep state.

At a next announcement time, the STA 2 enters the awake state, obtains the channel access right on the basis of the PIFS, and transmits the service announcement frame (step S1251).

In step S1231, the STA 1 may transmit the service announcement frame, and after the service announcement interval elapses, may re-enter the awake state to attempt the transmission of the service announcement frame. For this, the STA 1 intends to observe a channel on the basis of the DIFS and to acquire the channel access right. Accordingly, the channel access right cannot be acquired due to the STA 2 which observes the channel on the basis of the PIFS, and the service announcement frame transmitted from the STA 2 is received (step S1252). The STA 1 may configure the service announcement interval to '3*unit service announcement interval', and may include the service information of the STA 1, the STA 2, and the STA 3 to the service announcement frame. Upon receiving the service announcement frame, the STA 1 enters the sleep state. Thereafter, the STA 1 may enter the awake state at an announcement time based on a newly configured service announcement interval from a time of performing step S1231, and thus may attempt the transmission of the service announcement frame.

According to the service announcement method described with reference to FIG. 12, when a new STA is added, the new STA first transmits a service announcement frame including service information of the STA and service information of the existing STA. If an STA which transmits a service announcement frame including updated service information waits on the basis of a shorter channel observation time such as a PIFS and if a plurality of STAs intend to additionally transmit a service announcement frame including updated service information, since a channel access is attempted through random backoff after waiting for the PIFS, an acquired priority for frame transmission may be higher than different STAs which wait on the basis of the DIFS.

An STA which periodically broadcasts the service announcement frame according to an original service announcement interval waits on the basis of a typical channel observation time such as the DIFS, and if necessary, attempts the channel access through the random backoff. Therefore, a priority for frame transmission may be lower than different STAs which announce updated service information. That is, as a new STA which intends to announce service information is introduced, an announcement time of the existing STA may be shifted by a unit service announcement interval. The service announcement interval may be increased by the unit service announcement interval whenever one STA is added. Therefore, each STA may transmit a service announcement frame including its service information and information of another STA at a different time.

The service provider may stop the provided service. This includes a case where the service provider leaves the network or decides not to provide the service and/or a case where the service provider cannot provide the service. If one service provider cannot provide the service, there is a need to update a service announcement interval of different service providers and service information included in the service announcement frame.

Therefore, a service provider who desires to stop the service may broadcast a service announcement frame excluding its service information to announce this or may broadcast the service announcement frame by defining a new message for announcing that the service is not provided. The message must be transmitted when the different service provider enters the awake state, and must be preferentially transmitted in comparison with a service announcement frame transmitted by the different service provider.

The service provider enters the awake state at its announcement time, i.e., an awake time based on a service announcement interval, and transmits a service announcement frame. The service provider may previously receive the service announcement frame from a different service provider. In this case, a service announcement frame transmitted at a current announcement time includes both service information received previously and service information to be announced by the service provider. A format of the service announcement frame may use the format of FIG. 11.

A service provider which intends to stop the provided service transmits the service announcement frame one more time after the service announcement interval. In this case, the service announcement frame may not include service information thereof. If the service announcement frame is transmitted to announce the stop of the service, the service provider may observe a channel on the basis of a shorter observation time (e.g., PIFS or SIFS) to acquire the channel access right, and may transmit the frame. That is, if the service provider announces the stop of the service, it may be implemented such that the channel access right can be preferentially acquired.

Upon receiving the service announcement frame, the service provider determines whether service information included in the service announcement frame is changed. If the number of service providers related to service information included in a newly received service announcement frame is decreased, the service provider may decrease the service announcement interval according to the decreased number of service providers. For example, if the number of service providers is decreased by one, the service announcement interval may be set to a value which is decreased by a unit service announcement interval from the existing service announcement interval. Subsequently, while the channel state is observed during an observation time (e.g., PIFS or SIFS) shorter than a next announcement time and a service announcement frame is transmitted, the service announcement frame may include the remaining service information other than service information related to the excluded service provider. An STA which updates the service announcement interval and the service announcement frame may operate by transitioning between the awake state and the sleep state according to the updated service announcement interval, and may transmit the service announcement frame according to the interval.

Figure 13:
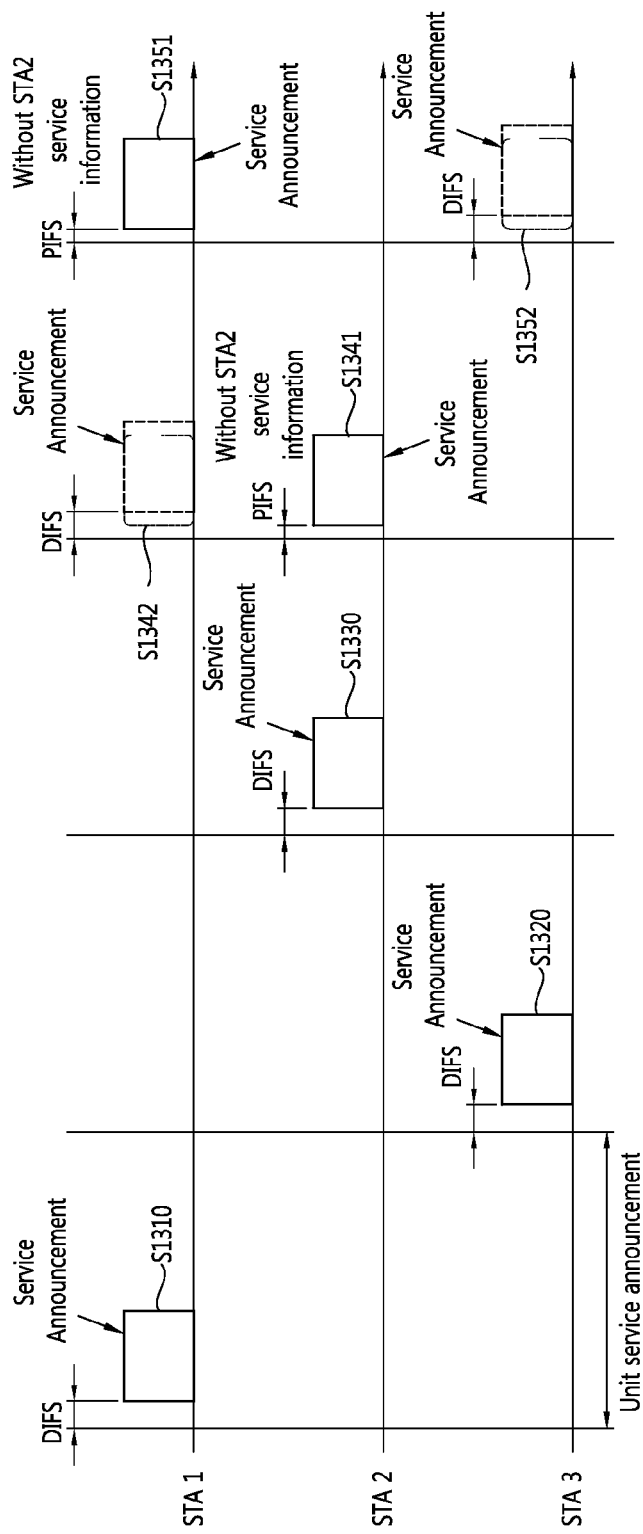
FIG. 13 shows another example of a service announcement method according to an embodiment of the present invention.

The service announcement method according to the aforementioned embodiment may be performed as shown in FIG. 13.

FIG. 13 shows another example of a service announcement method according to an embodiment of the present invention.

Referring to FIG. 13, an STA 1, an STA 2, and an STA 3 are service providers, and are under operation by configuring a service announcement interval to '3*unit service announcement interval value'.

The STA 1, the STA 2, and the STA 3 enter an awake state, in turn, at each announcement time based on the service announcement interval, and transmit a service announcement frame (steps S1310, S1320, S1330). The service announcement frame includes service information of the STA 1, the STA 2, and the STA 3.

Meanwhile, the STA 2 enters the awake state at an announcement time of the STA 2 to announce the stop of its service, acquires a channel access right on the basis of a PIFS which is an observation time shorter than a typical observation time and thereafter broadcasts a service announcement frame (step S1341). The service announcement frame includes service information of the STA 1 and the STA 3, and does not include service information of the STA 2.

The STA 1 enters the awake state according to the announcement time and attempts the transmission of the service announcement frame on the basis of the typical observation time DIFS. However, since the STA 2 first acquires the channel access right, the STA 1 cannot transmit the service announcement frame. Therefore, the STA 1 receives a service announcement frame transmitted by the STA 2 (step S1342). The STA 1 determines whether to update service information on the basis of the received service announcement frame. The STA 1 confirms that the service information of the STA 2 is not included in the frame, and updates a service announcement interval and the service information to be included in the service announcement frame to be transmitted by the STA 1 at a later time. The STA 1 may determine to generate the service announcement frame by excluding the service announcement frame of the STA 2, and may configure the service announcement interval to '2\*unit service announcement interval value'. The STA 1 may enter a sleep state after receiving the service announcement frame.

The STA 1 enters the awake state at a next announcement time, acquires the channel access right on the basis of a PIFS, and thereafter transmits a service announcement frame (step S1351). The service announcement frame includes service information of the STA 1 and the STA 3. The STA 1 which transmits the service announcement frame may enter the sleep state.

The STA 3 enters the awake state according to the announcement time and attempts the transmission of the service announcement frame on the basis of the DIFS. However, since the STA 1 first acquires the channel access right, the STA 3 cannot transmit the service announcement frame. Therefore, the STA 3 receives the service announcement frame transmitted by the STA 1 (step S1352). The STA 3 determines whether to update service information on the basis of the received service announcement frame. The STA 3 confirms that service information of the STA 2 is not included in the frame, and updates a service announcement interval and the service information to be included in the service announcement frame to be transmitted by the STA 1 at a later time. The STA 3 may determine to generate the service announcement frame by excluding the service announcement frame of the STA 2, and may configure the service announcement interval to '2\*unit service announcement interval value'. The STA 3 may enter the sleep state after receiving the service announcement frame.

Thereafter, the STA 1 and the STA 3 may configure the service announcement interval to '2\*unit service announcement interval value', and may broadcast the service announcement frame by transitioning between the awake data and the sleep state according to a newly configured service announcement interval.

According to FIG. 13 described above, an STA may determine whether to update service information included in a service announcement frame transmitted by the STA and a service announcement interval which is a transmission period of the service announcement frame on the basis of service information included in a service announcement frame received from another STA. In doing so, the STA may broadcast currently provided service information by including the information to the service announcement frame. In addition, since the service announcement interval can be regulated according to the number of STAs which provide the service, a power-save mode of the STA which provides the service can be effectively managed.

Although an embodiment in which an STA adds service information provided by another STA is shown in FIG. 12 and an embodiment in which an STA excludes information of a service stopped by another STA is shown in FIG. 13, FIG. 12 and FIG. 13 may be combined in implementation. That is, an STA may regulate service information to be included in a service announcement frame to be transmitted by the STA on the basis of service information included in a service announcement frame transmitted from a different STA. In case of discovering service information included only in a service announcement frame transmitted from the different STA, an STA transmits the service information by including the information to a service announcement frame to be transmitted by the STA itself. In case of discovering service information included only in a service announcement frame to be transmitted by the STA itself, the STA transmits the service announcement frame except for the service information. In doing so, a service announcement frame which is broadcast by each STA may include only information related to a currently provided service, and thus a service consumer, i.e., an STA which intends to discover a service, may acquire updated service information. In addition, if the service information included in the service announcement frame is updated, an STA which intends to broadcast this may preferentially acquire the channel access right, thereby being able to guarantee reliability of the updated service.

Figure 14:
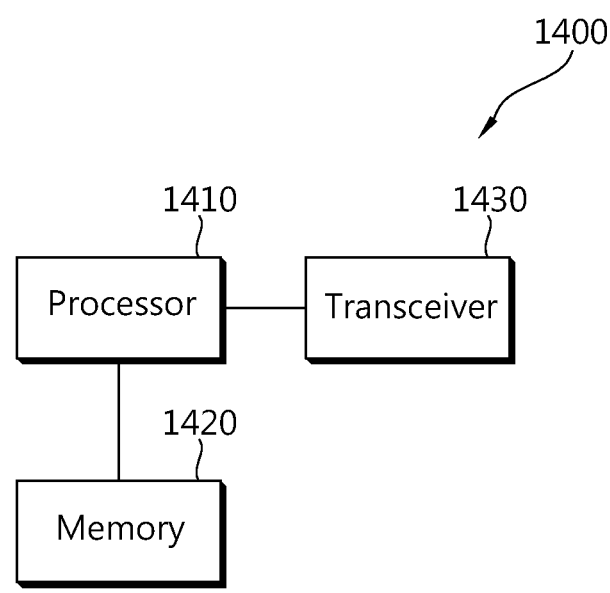
FIG. 14 is a block diagram showing a wireless device according to an embodiment of the present invention.

FIG. 14 is a block diagram showing a wireless device according to an embodiment of the present invention. The wireless device may be implemented with an AP and/or an STA in the aforementioned embodiment of the present invention with reference to FIG. 4 to FIG. 13.

Referring to FIG. 14, a wireless device 1400 includes a processor 1410, a memory 1420, and a transceiver 1430.

The transceiver 1430 transmits and/or receives a radio signal, and implements an IEEE 802.11 physical layer.

The processor 1410 may be operatively coupled to the transceiver 1430 to generate a frame to be transmitted and to transmit the frame by delivering it to the transceiver 1430. The processor 1410 may be configured to process the frame received from the transceiver 1430 and to acquire information. The processor 1410 may be configured to request a service requested on the basis of a GAS protocol and to send a response for the request. The processor 1410 may be configured to broadcast information related to a service provided periodically by the processor 1410 itself. Upon acquiring the service related information from a different wireless device such as an STA, the processor 1410 may be configured to determine whether to update the service related information to be transmitted. Upon acquiring the service related information from the different wireless device such as the STA, the processor 1410 may be configured to determine whether to regulate a service announcement interval for transmitting the service related information. The processor 1410 may be configured to implement the service discovery and announcement method according to the aforementioned embodiment of the present invention with reference to FIG. 4 to FIG. 13.

The processor 1410 and/or the transceiver 1430 may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. When the above-described embodiment is implemented in software, the above-described scheme may be implemented using a module (process or function) which performs the above function. The module may be stored in the memory 1420 and executed by the processor 1410. The memory 1420 may be disposed to the processor 1410 internally or externally and connected to the processor 1410 using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for discovering a service by a station in a wireless local area network, the method comprising:
   randomly selecting, by a station, a service announcement interval from a plurality of service announcement intervals;
   randomly selecting, by the station, a value of a backoff counter in a range of zero to a predetermined value;
   when the value of the backoff counter reaches zero, transmitting, by the station, a service announcement frame to at least one neighboring station from a start of the selected service announcement interval,
   wherein the service announcement frame includes service information, channel information and interval information,
   wherein the service information indicates a type of service from a plurality of types of service provided by the station,
   wherein the channel information indicates a channel in which the station will be available for the service, and
   wherein the interval information indicates a time period that the station will be available for the service in the channel indicated by the channel information.

2. The method of claim 1, further comprising:
   checking, by the station, if a wireless medium is idle during the selected service announcement interval, and
   wherein the value of the backoff counter is selected if the wireless medium is not idle during the selected service announcement interval.

3. The method of claim 1, wherein the predetermined value is a contention window (CW) value.

4. A device configured for discovering a service for a wireless local area network, the device comprising:
   a transceiver configured to receive and transmit radio signals; and
   a processor operatively coupled with the transceiver and configured to:
   randomly select a service announcement interval from a plurality of service announcement intervals;
   randomly select a value of a backoff counter in a range of zero to a predetermined value; and
   when the value of the backoff counter reaches zero, transmit, via the transceiver, a service announcement frame to at least one neighboring station from a start of the selected service announcement interval,
   wherein the service announcement frame includes service information, channel information and interval information,
   wherein the service information indicates a type of service from a plurality of types of service provided by the station,
   wherein the channel information indicates a channel in which the device will be available for the service, and
   wherein the interval information indicates a time period that the station will be available for the service in the channel indicated by the channel information.

5. The device of claim 4, wherein the processor is further configured to check if a wireless medium is idle during the selected service announcement interval, and
   wherein the value of the backoff counter is selected if the wireless medium is not idle during the selected service announcement interval.

6. The device of claim 4, wherein the predetermined value is a contention window (CW) value.

* * * * *